United States Patent
Desilvestro et al.

(10) Patent No.: US 7,476,463 B2
(45) Date of Patent: Jan. 13, 2009

(54) RECHARGEABLE BIPOLAR HIGH POWER ELECTROCHEMICAL DEVICE WITH REDUCED MONITORING REQUIREMENT

(75) Inventors: Hans Desilvestro, Howick (NZ); Casey Ann Van Veen, Manurewa (NZ); Nancy Lan Jiang, Remuera (NZ); Brett Ammundsen, Piha (NZ)

(73) Assignee: Pacific Lithium New Zealand Limited (NL)

( * ) Notice: Subject to any disclaimer, the term of this patent is extended or adjusted under 35 U.S.C. 154(b) by 60 days.

(21) Appl. No.: 10/568,129

(22) PCT Filed: Aug. 16, 2004

(86) PCT No.: PCT/EP2004/009183

§ 371 (c)(1),
(2), (4) Date: Nov. 3, 2006

(87) PCT Pub. No.: WO2005/018038

PCT Pub. Date: Feb. 24, 2005

(65) Prior Publication Data

US 2007/0042264 A1 Feb. 22, 2007

Related U.S. Application Data

(60) Provisional application No. 60/495,324, filed on Aug. 15, 2003.

(51) Int. Cl.
*H01M 10/04* (2006.01)
*H01M 2/08* (2006.01)

(52) U.S. Cl. .................. 429/152; 429/160; 429/185; 429/210

(58) Field of Classification Search .............. 429/152, 429/153, 154, 155, 160, 162, 185, 210
See application file for complete search history.

(56) References Cited

U.S. PATENT DOCUMENTS

| 4,448,860 | A | 5/1984 | Von Alpen et al. |
| 6,294,292 | B1 * | 9/2001 | Tsushima et al. ....... 429/162 X |
| 6,371,997 | B1 | 4/2002 | Chang et al. |

(Continued)

FOREIGN PATENT DOCUMENTS

EP 0973180 1/2000

(Continued)

*Primary Examiner*—Stephen J. Kalafut
(74) *Attorney, Agent, or Firm*—Factor & Lake

(57) ABSTRACT

The present invention is drawn to a high power electrochemical energy storage device in a bipolar configuration, comprising at least n stackable cells in bipolar configuration wherein subgroups of m cells are electronically monitored. The storage cells have a lithium ion insertion anode and a lithium ion insertion cathode, a separator, an electrolyte system, and a leak-proof seal structure. A number of embodiments are disclosed, characterized by a favorable range of m values, in combination with the anode-to-cathode capacity ratio, electrolyte conductivity, and other battery key features, thereby providing a high power device providing long cycle life and excellent power performance over many thousand charge and discharge cycles while minimizing the cost for electronic monitoring. Additionally, the present invention is drawn to a device combining two or more groups of stackable cells in bipolar configuration, either in series or in parallel or any combination thereof, so as to create a high power, high voltage energy storage device.

25 Claims, 7 Drawing Sheets

U.S. PATENT DOCUMENTS

2002/0051904 A1  5/2002  Ito et al.
2003/0099884 A1*  5/2003  Chiang et al. ........... 429/210 X
2003/0194605 A1* 10/2003  Fauteux et al. ............ 429/66 X
2005/0069768 A1*  3/2005  Martinet et al. ............. 429/210

FOREIGN PATENT DOCUMENTS

| JP | 05062712 | 3/1993 |
| WO | WO-03/012908 | 2/2003 |
| WO | WO-03/047021 | 6/2003 |
| WO | WO-03/085751 | 10/2003 |

* cited by examiner

RECHARGEABLE BIPOLAR HIGH POWER ELECTROCHEMICAL DEVICE WITH REDUCED MONITORING REQUIREMENT

CROSS-REFERENCE TO RELATED APPLICATION

This application is a national phase application under 35 U.S.C. §371 of International Application Number PCT/EP2004/009183, filed on Aug. 16, 2004, which claims priority to U.S. Ser. No. 60/495,324, filed on Aug. 15, 2003, both of which are incorporated herein by reference.

BACKGROUND

1. Field of the Invention

The present invention relates in general to electrochemical devices, and, more particularly to a high power electrochemical device in bipolar configuration capable of providing instantaneously available high power. The high power device is based on a nonaqueous electrolyte system containing lithium salt. Anode and cathode are constructed from high rate, highly stable and low cost materials and are selected to provide maximum device safety. Additionally, the present invention relates to the number of voltage-monitored cells connected in series in a bipolar configuration, in combination with the anode-to-cathode capacity ratio and with other device parameters, in order to provide an overall low-cost system having excellent cycle life and outstanding power performance.

2. Prior Art

The need for power quality is ever increasing. Current and future sophisticated electric and electronic devices are, and will continue to be, increasingly sensitive to power supply issues. For example, poor power supply and transient power losses in supplied main power can have an adverse impact on electronic equipment. Such power issues can result in the destruction of electronic equipment, the loss of generated data, the loss of communication with other equipment, and the loss of time required to reset and restart procedures that were interrupted by the power failure. Certain solutions have been developed to provide instantaneous power in response to transient power interruptions and other associated power problems, including uninterruptible power supply (UPS) systems. In such systems, lead-acid batteries are often used to provide temporary power when necessary. While such solutions have had some success, lead-acid batteries have certain problems, including, but not limited to, unsatisfactory cycle life, a high failure rate, high cost of maintenance, high weight, large size, toxicity of the battery materials, risk of hydrogen leaks posing a safety hazard, self discharge issues, and sensitivity to deep discharge and to temperature.

Another important area of application for high power electrochemical devices is in the automotive industry for hybrid electric vehicles and for a wide range of power assist functions. In order to reduce air pollution, particularly in congested cities, fuel efficiency needs to be further increased. This objective can be achieved by battery systems capable of providing instantaneous power for acceleration and hill climbing and the capability for regenerative braking. Such battery systems have to be able to provide and/or to absorb significant amounts of power over the relatively short period of a few seconds only. In addition, there is an increasing array of electrically powered ancillary systems in modern cars, e.g. for preheating catalytic converters, for electric brake or steering force amplifiers, drive. by wire, electrically controlled shock absorbers, and the like.

These and other applications for industries including, but not limited to, car manufacturers, providers of public transport, power quality, power back-up systems, and remote area power supplies in combination with wind turbines, photovoltaic cells and/or an electricity generator based on fossil fuels such as diesel or natural gas, will increasingly require compact and low-cost storage systems capable of delivering large amounts of electrical power from a limited volume. In order to fulfill requirements for such power systems, the present invention is directed to an electrochemical energy storage device, such as a rechargeable battery device, wherein both the cathode and the anode are constructed from high rate, highly stable and low cost materials and assembled in a bipolar configuration. While battery devices exist in the older battery technologies of lead-acid, nickel-cadmium, and nickel-metal hydride, large high power Li-ion batteries have not been introduced in significant quantities to the market place yet, mainly due to safety considerations and due to the requirement of single cell control. Electronic control of each cell would add considerably to the cost and the complexity of high voltage, high power back-up or power assist systems based on standard Li-ion batteries. It is therefore an object of this invention to provide a means whereby electronic control can be drastically reduced.

A Li-ion battery comprising lithiated titanate anodes, manganese oxide-based cathodes, and a poly(acrylonitrile) polymer electrolyte has been described, for example in U.S. Pat. No. 5,766,796. Such a configuration is however not in the spirit of the present invention since the capacity utilization at rates being significantly larger than 10C is too low for high power applications. Battery discharge and charge currents are often given in "C"-rate. 10C corresponds to ten times the amount of current in relation to the amount of battery capacity (e.g. a 10 Ampere current for a 1 Ampere hour battery). A bipolar Li-ion battery device with excellent high power performance, stability, and safety characteristics has recently been disclosed in PCT Application "rechargeable High Power Electrochemical Device." Those skilled in the art will appreciate that a bipolar configuration with a maximum number of cells in series leads to a battery with maximum energy density and a lower cost for electronic monitoring of the battery. On the other hand, too many cells in series without electronic monitoring may limit battery life because slight differences from cell to cell may lead to voltage differences during charge and discharge. If one or several cells are continuously slightly overcharged battery life may be reduced. No optimum number of cells connected in series without electronic monitoring can be given from first principles. We discovered that there is a complex and unexpected interrelationship between battery life and battery design parameters including, but not limited to, the number, m, of cells in a voltage-monitored subgroup in a bipolar battery, anode-to-cathode capacity ratio, and electrolyte properties such as conductivity. It is, therefore, an object of this invention to provide key features enabling a high power battery in bipolar configuration to have long cycle life and excellent power performance over tens of thousands of discharge and charge pulses while minimizing the cost for electronic monitoring.

These and other objectives will become apparent in light of the specification and claims appended thereto.

SUMMARY OF THE INVENTION

The present invention is directed, generally, to a high power battery comprising at least one stackable battery unit capable of producing high power upon demand. The battery unit includes at least two sealed electrochemical energy storage cells connected in series, preferably in bipolar configuration. The cells have a lithium ion insertion anode and a lithium ion insertion cathode and a bipolar current collector between cells. The device also has the at least two storage cells substantially aligned adjacent one another, a separator material associated between the anode and the cathode within each cell, an electrolyte system within each cell, and a seal structure providing a liquid-proof seal.

Preferably, the anode of the present invention comprises a lithium ion insertion material having a voltage of greater than 0.5 V vs. the $Li/Li^+$ potential, and even more preferably, a voltage of approximately 1.5 V vs. the $Li/Li^+$ potential. For example, the anode could include a lithiated titanium oxide. The cathode preferably includes a doped lithium manganese oxide or any other low cost material offering high stability, high safety and sufficient rate performance such as $LiFePO_4$ or layered manganese-based oxides, modified by elements such as nickel and/or cobalt. Once assembled, it is preferred that the device has a charge and discharge capability of at least 0.04 $A/cm^2$ for more than 30 s and preferably for more than 60 s.

In one preferred embodiment of the present invention, the device comprises two end plates at either end of the aligned at least two storage cells, each end plate comprising an electrically conductive surface area, and two terminal plates conductively associated with the end plates, wherein the terminal plates of the device are electrically contacted over at least 20% of the end plate surface area by at least two contacting means. The contacting means includes, but are not limited to, an electrically conductive film, a mat of electrically conductive foam, felt, and expanded or a woven metal mesh The contacting means may comprise mechanical pressure or the electrical contact may be achieved through any welding, soldering, bolting, or crimping process, or through the use of electrically conductive adhesives. In the aforementioned case of mechanical pressure, the mechanical pressure may be applied by a mechanical device including, but not limited to, nuts and bolts, spring loads, shrink tubing, elastic or inelastic straps, or a housing containing vacuum of up to minus one atmosphere relative to ambient pressure. It is also preferred that one or more terminal cables are joined to each of the two terminal plates to provide the electrical connection to the entire battery device.

In the invention, it is preferred that the electrolyte system comprise a nonaqueous electrolyte system. A number of electrolyte types can be effective in this environment, including a lithium-based salt selected from the group consisting of $LiPF_6$, $LiBF_4$, $LiN(SO_2CF_3)_2$, $LiN(SO_2C_2F_5)_2$, $LiC(SO_2CF_3)_3$, $LiClO_4$, $LiF_6$, lithium bisoxalatoborate and other lithium borates. Preferably, the present embodiment also includes at least one electrolyte solvent, wherein the at least one solvent is associated with the electrolyte. Preferably, the at least one electrolyte solvent has a boiling point of 80° C. or greater, most preferably 150° C. or greater, in order to allow for safe device operation up to at least 60° C., even under severe conditions. It is also preferred that the solvent is selected from the group including, but not limited to, propylenecarbonate, ethylenecarbonate, diethylcarbonate, dimethylcarbonate, ethyl-methylcarbonate, gamma-butyrolactone, ethylacetate, ethylbutyrate, ethylpropionate, methylbutyrate, 1,2-dimethoxyethane, 1,2-diethoxyethane, 2-methoxyethyl-ether, methoxypropionitrile, valeronitrile, dimethylaceta-mide, diethylacetamide, sulfolane, dimethysulfite, diethysulfite, trimethylphosphate and ionic liquids.

DETAILED DESCRIPTION OF THE INVENTION

Figure 1:
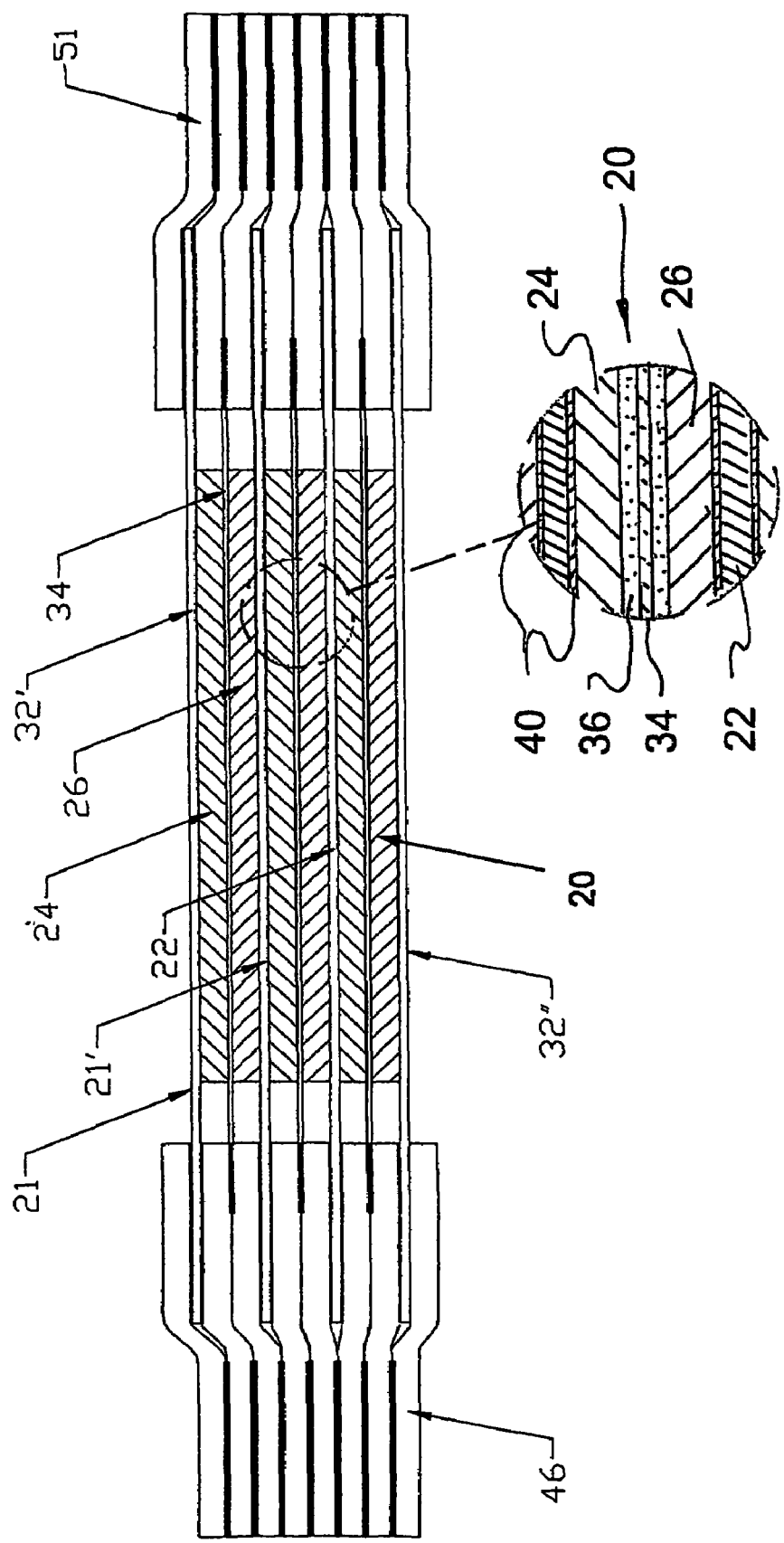
FIG. 1 is a cross-sectional schematic of a three-cell bipolar battery (n=3) in accordance with principles of this invention.

While this invention is susceptible of embodiment in many different forms, there will herein be described in detail and shown in the drawings, several specific embodiments with the understanding that the present disclosure is to be considered as an exemplification of the principles of the invention and is not intended to limit the invention to the embodiments so illustrated.

The present high power battery device has at least one bipolar plate 22, and at least two endplates 32', 32". FIG. 1 exemplifies an embodiment consisting of two bipolar plates 22 and two end plates 32', 32" stacked on top of each other, resulting in three electrochemical energy storage cells connected in series in a bipolar configuration. Each of the electrochemical energy storage cells 20 contains two substrate plates 21, 21', an electrochemically active anode layer 24, an electrochemically active cathode layer 26, a separator 34 and an adequate amount of electrolyte solution 36. FIG. 1 shows as a specific embodiment an example where at least one substrate plate 21' is common to two adjacent cells. The substrate plates are preferably of high electrical conductivity and relatively thin, i.e. preferably between approximately 10 and 100 micrometers, more preferably between 15 and 50 micrometers. Aluminum, nickel or copper-aluminum or copper-nickel bimetallic current collectors may be considered. The substrate plates 21, 21' can optionally be covered on at least part of at least one side of the substrate plates by a layer of primer 40. The primer 40 is based preferably on a carbonaceous film. It may be deposited from a water-based ink containing carbonaceous particles and a suitable binder, such as is available commercially from ACHESON®, or as disclosed in U.S. Pat. No. 6,087,045. However, any other conductive material, or any other technique such as spray, plasma, sputter, or vacuum deposition can be used, as long as it is deposited on a secure, conductive surface is onto which anode film 24 and cathode film 26 may be applied.

Anode 24 and cathode 26 comprise lithium ion insertion materials. In a preferred embodiment, these lithium ion insertion materials are combined with a binding agent to create a paste containing the active material of the cell and possibly a conductivity-enhancing agent such as particulate carbon or nickel. This paste is then applied to at least one side of substrate plates 21, 21' creating a film. It should be noted that both anode 24 and cathode 26 can be used in a variety of forms, but for the sake of simplicity will be referred to as "films" throughout the following discussion. Films are dried and compacted after application in order to obtain the desired electrode porosity, preferably in the range of 30-60%. Electrode compaction can be achieved through a calendering process, through two or several rolls, or through any other process applying sufficient mechanical pressure, or a combination of mechanical pressure and heat. Alternatively, the electrodes can be applied in any pattern. Patterning may be advantageous for processing reasons.

Preferably, lithium ion insertion materials comprise any of a number of materials capable of providing at the same time high-power, high safety and relatively low cost of the electrochemical storage device. For example, cathode 26 of the present invention preferably comprises a doped lithium manganese oxide cathode, most preferably of the spinel type. Alternatively, the cathode could comprise $LiFePO_4$ or layered manganese-or nickel-based oxides, modified by elements such as Al, B, Ca, Co, Cr, Fe, Mg, Mb, Ni, Zn. Similarly, anode 24 preferably comprises a lithiated titanium oxide anode, such as $LiTi_2O_4$, $Li_{4+x}Ti_5O_{12}$, or $Li_xTiO_2$. In the most preferred embodiment, the anode material is of the spinel type.

The anode materials disclosed above provide an important characteristic to the present invention. The use of, for example, a lithiated titanium oxide anode ensures a relatively positive electrode potential of around 1.5 V vs. the $Li/Li^+$ potential. This potential provides, in contrast to standard lithium-ion cells, a large safety margin to avoid plating of metallic lithium during fast recharge of the high power battery device. This safety margin is additionally of importance for high voltage batteries based on lithium ion insertion materials according to the present invention, since there is a higher probability that a cell in a battery device comprising a large number of cells, which are not individually monitored by an electronic monitoring circuit and device, may become unbalanced in terms of its ratio of anode-to-cathode capacity. If a cell were to become unbalanced, the significantly increased voltage drop during discharge and the very significant increase in cell voltage required during charge, before metallic lithium plating could occur on the cathode or the anode, respectively, provides for easier detection of an arising problem in a string of cells in a bipolar battery according to the present invention compared to standard Li-ion batteries. While increased cell voltage during charge of an unbalanced cell could still lead to premature loss of capacity and/or power capability, at least it would not affect the safety of the battery. Safety becomes even more challenging to manage with increasing number of cells in series in a bipolar configuration without individual cells or subgroups being monitored. Extensive electronic monitoring would result in increased cost due to the necessity of attaching monitoring tabs, wires or the like during the battery assembly process and also due to the cost of the electronic monitoring device and the associated electrical connections. Therefore, it is desirable to maximize the number, m, of cells connected in series in a voltage-monitored subgroup in a bipolar configuration, while still maintaining good battery life. Due to the specific chemistry and electrochemistry of the device according to the present invention, the anode-to-cathode capacity ratio, r, is selected with this specific chemistry and electrochemistry in mind. Most prior art rechargeable battery systems are characterized by an anode-to-cathode capacity ratio of larger than unity, meaning that the battery capacity is limited by the cathode. This is of particular importance for safety reasons in Li-ion, Ni-MH, Ni—Cd, and lead-acid batteries of the prior art. Anode-limitation of prior art Li-ion batteries could lead to the deposition of metallic lithium on the anode during charge, which would pose a serious safety hazard. We will show however, that embodiments according to the present invention with anode-to-cathode capacity ratios of smaller than unity can provide unique and advantageous features. Embodiments will be detailed hereunder providing long cycle life and excellent power, performance over tens of thousands of discharge and charge pulses while minimizing the cost for electronic monitoring.

The battery according to this invention further comprises a seal structure providing a leak-proof enclosure and electrical insulation between individual cells 20, resulting in a monolithic unit 10. FIG. 1 shows as an example how the seal structure 51 encases the bipolar plates 22 and end plates 32', 32" around their perimeters and provides a complete enclosure and insulation from cell to cell. In a specific embodiment, the seal structure 51 is created by applying a frame structure 46 around the perimeter of each bipolar plate 22 and each end plate 32', 32", followed by stacking the frame structures and the electrode plates on top of each other and by securing the frames and the electrode plates to each other around their perimeters by a welding, gluing, moulding or mould injection process or any other process known to those skilled in the art. In a specific embodiment the seal structure 51 consists of a thermoplastic material or of several thermoplastic layers laminated, welded or otherwise joined together. Suitable materials include polymers such as polypropylene or any other polyolefin, acid-modified polypropylene or polyolefins, polyester, polyvinylidenechloride, SURLYN® (a commercial thermoplastic ionomer resin by DuPont), ACLAR® (a fluoropolymer film by Honeywell) or any other material with appropriate barrier and electrical insulation properties, chemical and electrochemical compatibility with the battery components and processing characteristics. The seal structure may include additives or an additional barrier layer to improve the hermetic seal and/or to trap moisture or may be based on resins which are hardened at ambient or above-ambient temperature or by UV light or any other suitable source of radiation. Additionally, the seal structure may provide a section for at least one cell, where gas can accumulate or be absorbed by suitable getters in case of any parasitic side reaction evolving gaseous compounds.

As stated above, each cell 20 contains a nonaqueous electrolyte solution 36. The nonaqueous electrolyte solution 36 is applied before completely sealing all four sides of the monolithic unit 10. The electrolyte solution 36 may comprise a lithium-based salt selected from the group consisting of $LiPF_6$, $LiBF_4$, $LiN(SO_2CF_3)_2$, $LiN(SO_2C_2F_5)_2$, $LiC(SO_2CF_3)_3$, $LiClO_4$, $LiAsF_6$, lithium bisoxalatoborate and other lithium borates or any other salt providing a sufficient chemical and electrochemical stability and sufficient electrolytic conductivity in combination with a suitable organic solvent or a mixture of solvents. The electrolytic conductivity is preferably above 5 mS/cm at 25° C. and most preferably above 8 mS/cm at 25° C. The preferred range of concentration of the aforementioned lithium-based salt is between 0.6 and 1.8 M, the most preferred range of concentration is between 1.0 and 1.6 M. Preferred solvents have a boiling point of close to 80° C. or greater, most preferably 150° C. or greater, and include propylenecarbonate, ethylenecarbonate, diethylcarbonate, dimethylcarbonate, ethyl-methylcarbonate, gamma-butyrolactone, ethylacetate, ethylbutyrate, ethylpropionate, methylbutyrate, 1,2-dimethoxyethane, 1,2-diethoxyethane, 2-methoxyethylether, methoxypropionitrile, valeronitrile, dimethylacetamide, diethylacetamide, sulfolane, dimethysulfite, diethysulfite, trimethylphosphate and ionic liquids. Preferably, the electrolyte solution 36 is inserted into each cell 20 under partial vacuum conditions, preferably of −0.2 bar or lower, most preferably of −0.8 bar or better. Optionally, the electrolyte solution and/or at least part or the battery can be cooled down to minimise evaporation of any solvent.

FIG. 1 exemplifies an embodiment where the monolithic unit contains three cells in bipolar configuration. In principle, any total number, n, of cells 20 can be connected in series to form a monolithic unit in bipolar configuration as long as means are provided for adequate monitoring of subgroups. It is the object of the present invention to provide configurations, where the number, m, of cells in series in a voltage-monitored subgroup is limited to ten or less in order to achieve high battery life under deep discharge cycling as well as under prolonged pulse charge and discharge conditions. For reasons of processing and limiting the device voltage for operator safety in commercial applications, the total number, n, of cells per monolithic unit may be limited to a maximum of 50, and more preferably of to a maximum of 25.

Figure 2:
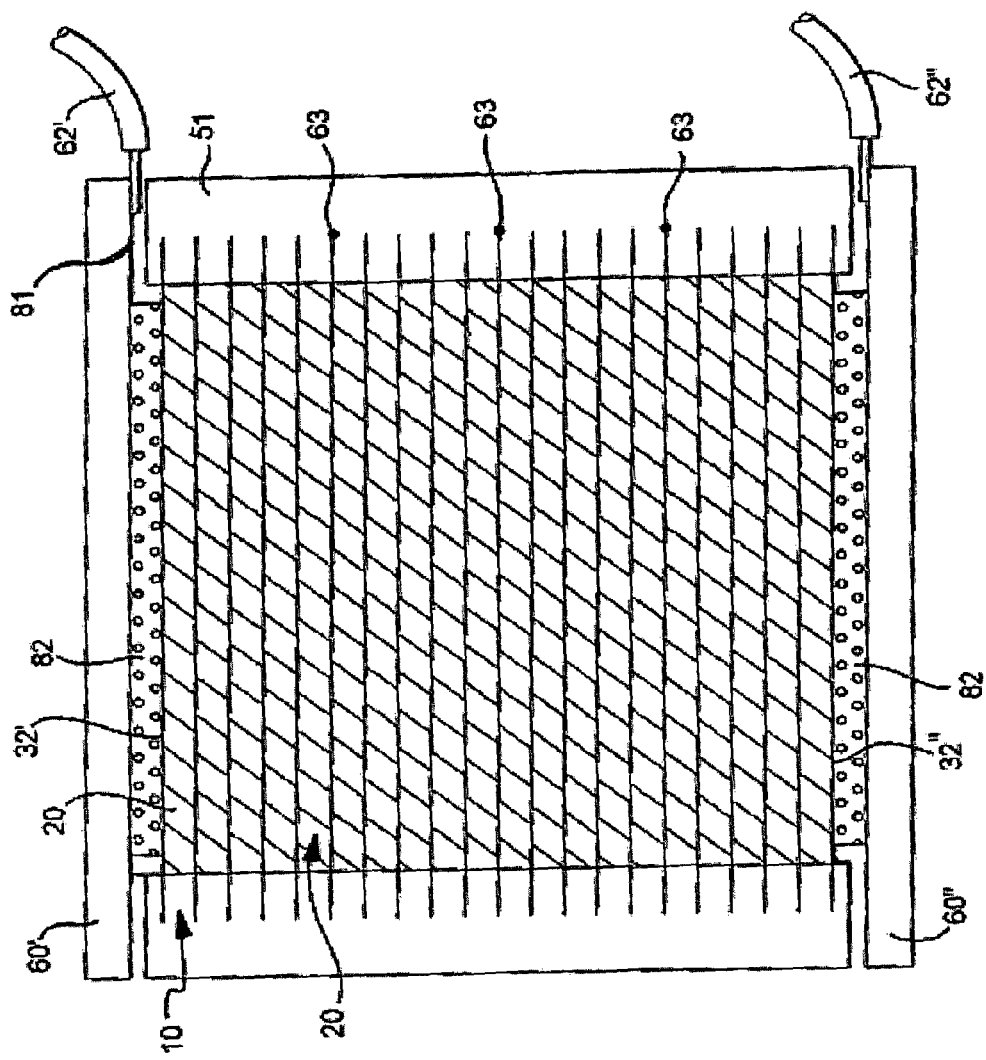
FIG. 2 is a cross-sectional schematic of a twenty-cell bipolar battery (n=20), comprising means for 5-cell monitoring (m=5) as a monolithic unit in accordance with principles of this invention.

FIG. 2 shows an example where twenty cells 20 are connected in series to form a monolithic unit 10 in bipolar configuration, where the voltages of subgroups of m=5 cells in series are monitored. This specific embodiment contains, as an example, five points for voltage monitoring, wherein two of the contact points are provided by any metallic contact to the end plates 32', 32" and three of the contacts are provided by monitoring means 63. Monitoring means 63 can consist of any wire, metallic strip or ribbon electrically connected to the corresponding bipolar plate 22 by any suitable welding, soldering or bonding process or any other process providing a reliable electrical contact. FIG. 2 shows an example, where contacting means 63 are partially imbedded in the seal structure 51. Alternatively, contacting means can be integral part of the electrode substrate 21', with the entire substrate or a fraction of it extending through the seal structure, as long as adequate electrical insulation is provided.

Additional power needs may be met by combining monolithic units 10 according to the present invention in either series or parallel relation. In a preferred embodiment, electrical contacts from the electrochemical storage device to the terminal cables 62', 62" is provided through terminal plates 60', 60" and contacting means 81. Terminal plates 60', 60" are preferably made of aluminum or any material providing good electrical conductivity and electrochemical compatibility with the end substrate plates 21 and/or the contacting means 81. Terminal plates 60', 60" are preferably much thicker than electrode substrate plates 21, 21', i.e. in the order of 0.1-10 mm, most preferably 0.3-1.0 mm. Contacting means 81 include any welding, soldering or bonding process, or mechanical pressure applied directly between terminal plates 60', 60" and end substrate plate 21 or through a contact element 82. Alternatively, at least one of the terminal plates 60', 60" and end substrate plates 21 can be roughened, embossed, profiled or otherwise structured to enhance electrical contact. Contact element 82 can consist of an electrically conductive film, a mat of electrically conductive foam, felt, expanded or a woven metal mesh. Materials for contact elements 82 are chosen mainly for their corrosion resistance, their electronic and thermal conductivity and their availability and cost. Copper, although suitable for reasons of electronic and thermal conductivity, and cost, is not the preferred material because of its long-term electrochemical incompatibility when contacted to aluminum, particularly in the presence of moisture or other corrosion-inducing agents. For the present invention, aluminum and nickel are the preferred materials. If the contacting means comprises mechanical pressure, such pressure can be provided by a mechanical device including, but not limited to, nuts and bolts, spring loads, shrink tubing, elastic or inelastic straps or a housing containing vacuum of up to minus one atmosphere relative to ambient pressure. Preferred level of compression is in the range of 0.02 MPa to 1 MPa.

Depending on the size of the battery and the application, the battery device will additionally comprise fuses, circuit breakers or electronic relays, temperature sensing devices such as thermistors, optionally in conjunction with an appropriate electronic circuit in order to monitor the battery device and to assure that voltage, current, and temperature remain within specified limits. In case of any abnormal behavior of the battery or parts of the battery, the whole battery or parts of the battery can be isolated electrically through the circuit breaker or electronic relay.

The principles of the invention described above, and specifically claimed herein, were used to assemble various battery devices consistent with the above disclosure. The assembly of the devices, as well as several alternative structures, will be described below. However, the present disclosure is not intended to limit the invention to any of the particularly disclosed structures, except insofar as the appended claims are so limited.

In order to construct the EXAMPLES according to principles of the present invention, two types of anode end plates with two different levels of active material loading (type A1, A2), one type of cathode end plates C and two types of bipolar plates with two different levels of active anode material loading (type B1, B2) were prepared. A 50 μm thick foil of high purity aluminum was primed with a suspension of graphite and carbon black in an aqueous solution of polysilicate. The suspension was coated onto one side of the aluminum foil only for end plates (A1, A2, C) and onto both sides for bipolar plates (B1, B2). After thoroughly drying the primer layer, the active anode and cathode materials, $Li_4Ti_5O_{12}$ and $Li_{1.05}Cr_{0.10}Mn_{1.90}O_4$ respectively, were coated on top of the primed layer from slurries based on N-methyl-2-pyrrolidinone, PVDF, and carbon to yield coated areas of 100 mm×100 mm. In the case of end plates, one side only was coated with either anode or cathode material. In the case of bipolar plates, one side was coated with anode, and the other with cathode material. All electrode plates were dried and calendered. TABLE 1, below, gives the nominal capacity for each side of the five different types of plates.

TABLE 1

| Plate type | Active material capacity, anode | Active material capacity, cathode |
|---|---|---|
| A1 (anode end plate) | 210 mAh | — |
| A2 (anode end plate) | 165 mAh | — |
| C (cathode end plate) | — | 190 mAh |
| B1 (bipolar plate) | 210 mAh | 190 mAh |
| B2 (bipolar plate) | 165 mAh | 190 mAh |

Frames of SURLYN® 1652 film (DuPont) were die-cut to outer dimensions of 140 mm×140 mm and an inner section of 102 mm×102 mm was cut and removed. An anode plate A1 was then placed between two frames and thermally bonded to the two frames by using a commercially available heated press. In this process, the outermost areas around the perimeters of the two frames were fused together as well, resulting in an easy-to-handle and easily stackable framed electrode. This process was repeated with all the electrode plates (A1, A2, C, B1, B2) required for the examples detailed hereunder. A 110 mm×110 mm piece of microporous polyolefinic separator was then positioned on top of each cathode layer and partially over the frame area of the corresponding plate. For each of the electrode plates, the separator was then heat-welded to the frame on two opposite sides.

EXAMPLES 1-8 were prepared according to a common procedure. The only variable parameters were the total number, n, of cells per monolith, connected in series, the anode-to-cathode capacity ratio, r, and the type of electrolyte solution. In each of the EXAMPLES 1-8, the total number, n, of cells per monolithic unit and the number, m, of cells in voltage-monitored subgroup was equal (n=m). All parameters for battery EXAMPLES 1-8 are summarized in TABLE 2. EC stands for ethylenecarbonate, DEC for diethylcarbonate, DMC for dimethylcarbonate and MPN for methoxypropionitrile. TABLE 3 gives the conductivities and the boiling points of the lowest boiling component of the electrolyte systems employed for the EXAMPLES described hereunder.

load cell from OMEGADYNE®. All EXAMPLES were tested at an ambient temperature of 22±2° C.

EXAMPLE 1

Figure 3:
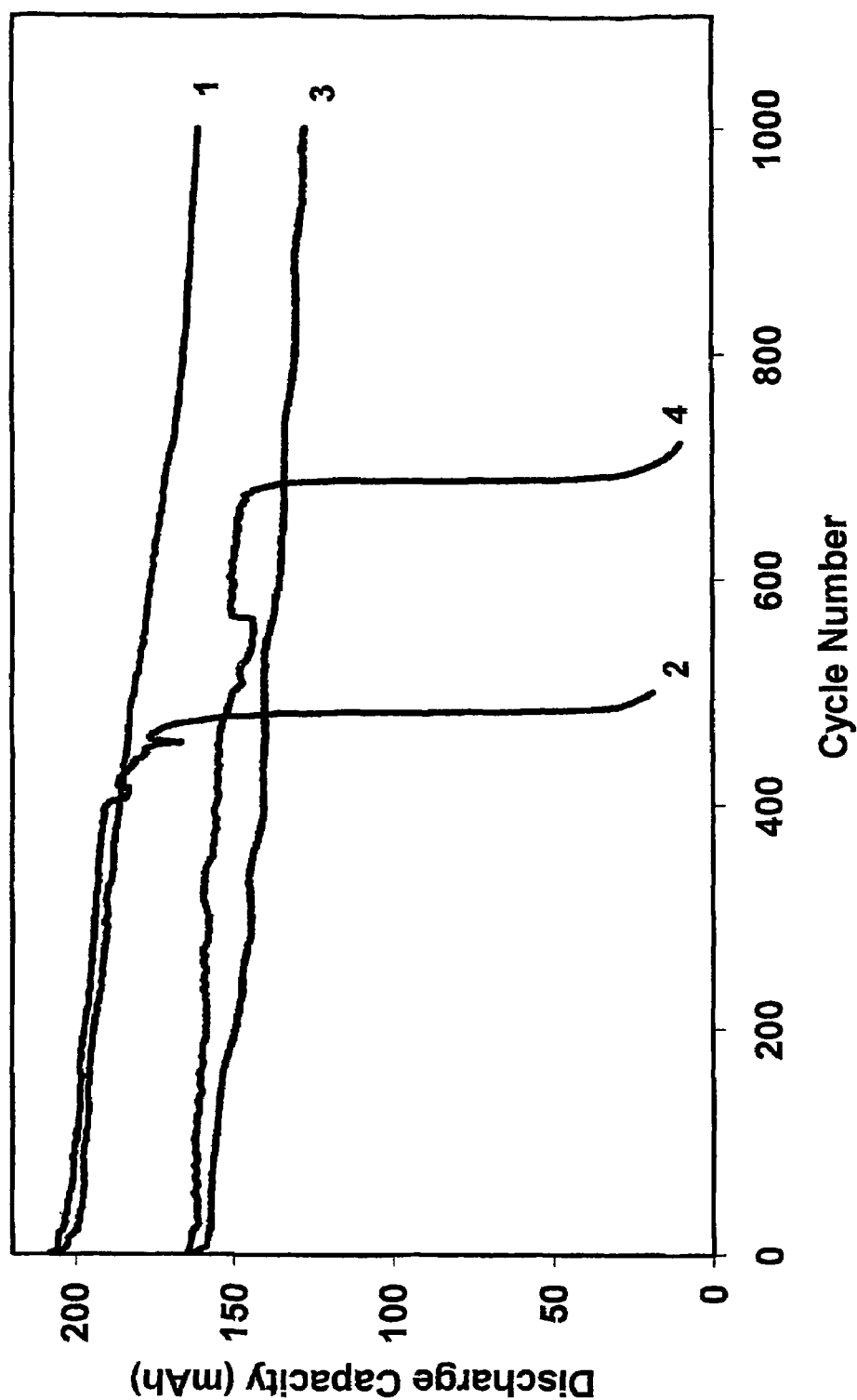
FIG. 3 is a graph displaying the capacity output as a function of cycle number for EXAMPLES 1-4 of the present invention.

FIG. 3 shows the capacity output of EXAMPLE 1, a five-cell bipolar battery under a compression corresponding to a 100 kg load, as a function of cycle number when the battery device was charged and discharged at the 1C rate of 190 mA. The initial battery capacity was close to the nominal cathode capacity of 190 mAh, confirming that batteries according to EXAMPLE 1 are cathode-limited. After 1000 complete charge/discharge cycles, the battery capacity was still 85% of nominal capacity, showing the excellent cycle stability of a five-cell bipolar battery according to the present invention.

Figure 4:
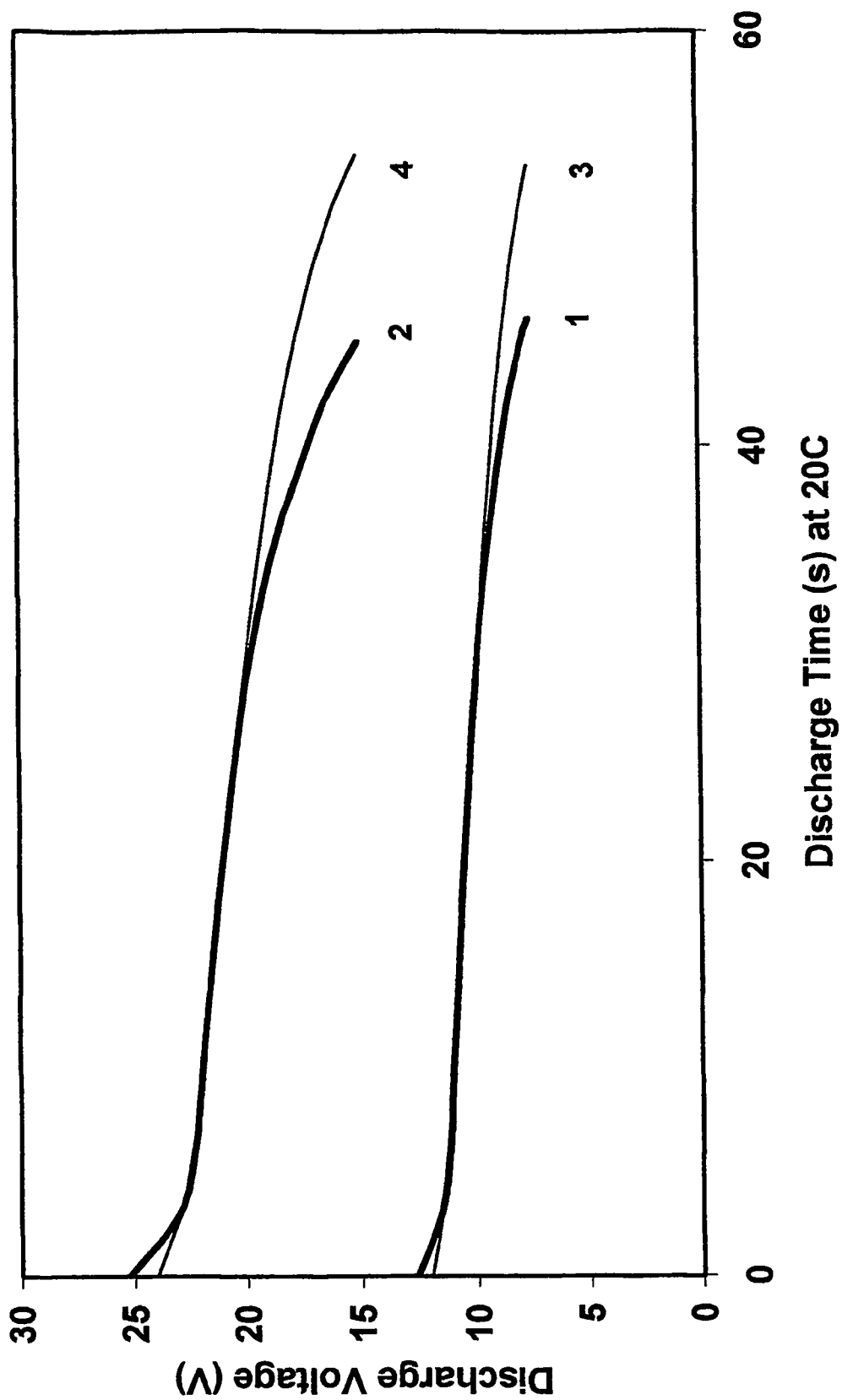
FIG. 4 is a graph displaying the high power discharge profiles for EXAMPLES 1-4 of the present invention.

A second bipolar battery according to EXAMPLE 1 was tested for its high power performance. It was fully charged at the 1C rate and then discharged at the 20C rate, corresponding to 0.04 A/cm$^2$. FIG. 4 shows the 20C discharge curve of EXAMPLE 1 in comparison with other EXAMPLES of the present invention. The battery run time of EXAMPLE 1 was 46 s when the cut-off voltage was set to 7.5 V, showing the favorable high power performance of the EXAMPLE according to the present invention.

A third bipolar battery according to EXAMPLE 1 was tested for its high power performance over continued high power pulses. After full charge at the 1C rate, the pulse sequence detailed in TABLE 4 was applied. Results are given in TABLE 5 in comparison with other EXAMPLES of the present invention. EXAMPLE 1 provided 77,000 15 s pulses at the 20C rate, corresponding to 0.04 A/cm$^2$, before the discharge voltage dropped to below 7.5 V, showing the favorable stability under continuous high power stress conditions of the EXAMPLE according to the present invention.

TABLE 2

|  | Electrode plates | n = m | Nominal voltage | R | Cell capacity limited by | Electrolyte system |
| --- | --- | --- | --- | --- | --- | --- |
| EXAMPLE 1 | C, B1, A1 | 5 | 12.5 V | 1.1 | Cathode | 1 M LiPF$_6$, 1:1 EC:DEC |
| EXAMPLE 2 | C, B1, A1 | 10 | 25 V | 1.1 | Cathode | 1 M LiPF$_6$, 1:1 EC:DEC |
| EXAMPLE 3 | C, B2, A2 | 5 | 12.5 V | 0.87 | Anode | 1 M LiPF$_6$, 1:1 EC:DEC |
| EXAMPLE 4 | C, B2, A2 | 10 | 25 V | 0.87 | Anode | 1 M LiPF$_6$, 1:1 EC:DEC |
| EXAMPLE 5 | C, B1, A1 | 5 | 12.5 V | 1.1 | Cathode | 1 M LiPF$_6$, 1:1 EC:DMC |
| EXAMPLE 6 | C, B2, A2 | 5 | 12.5 V | 0.87 | Anode | 1 M LiPF$_6$, 1:1 EC:DMC |
| EXAMPLE 7 | C, B1, A1 | 5 | 12.5 V | 1.1 | Cathode | 1 M LiPF$_6$, MPN |
| EXAMPLE 8 | C, B1, A1 | 5 | 12.5 V | 1.1 | Cathode | 1.3 M LiPF$_6$, MPN |

TABLE 3

| Electrolyte system | Conductivity at 24 ± 1° C. | Boiling point of lowest boiling component |
| --- | --- | --- |
| 1 M LiPF$_6$, 1:1 EC:DEC | 7.5 mS/cm | 109° C. |
| 1 M LiPF$_6$, 1:1 EC:DMC | 11.7 mS/cm | 91° C. |
| 1M LiPF$_6$, MPN | 10.9 mS/cm | 166° C. |
| 1.3 M LiPF$_6$, MPN | 9.9 mS/cm | 166° C. |

A framed cathode end plate with its separator attached was laid on a flat surface with the cathode and separator facing upward. (n−1) framed bipolar plates, with their respective separator layer attached, were stacked on top of the cathode end plate, always with their cathode sides facing upward and the frame edges being properly aligned. Finally, a framed anode end plate, with its active side facing downward, was positioned on top of the stack Three sides of the resulting n-cell stack were then heat-sealed together by applying heat and pressure from the top and the bottom onto the frame edges. The appropriate amount of an electrolyte solution specified in TABLE 2 was then injected into each of the cells in order to thoroughly wet out the electrodes and the separator. The assembly was then evacuated close to −1 bar and the open edge sealed under vacuum. This procedure resulted in a n-cell bipolar monolithic unit of n×2.5 V nominal voltage. Two pieces of 1 mm thick 100 mm×100 mm nickel foam mat with 60 ppi pore size were placed onto both end plates followed by two terminal plates of 1 mm aluminum sheets of 100 mm×100 mm size, with a 10 mm wide tab being an integral part of each sheet. This assembly was placed between two rigid FORMICA® plates and then into a spring-loaded mechanical compression device, where compression corresponding to a 100 kg load was applied. In all EXAMPLES, the compression device was calibrated using a compression

TABLE 4

| Pulse step | Step description |
| --- | --- |
| 1 | 15 s discharge at 20 C rate, stop test if voltage drops to below n × 1.5 V |
| 2 | 20 s rest |
| 3 | Charge to n × 2.7 V |
| 4 | 10 s rest |
| 5 | Increase pulse counter by one unit and continue with step 1. |

TABLE 5

|  | Number of 20 C pulses achieved |
| --- | --- |
| EXAMPLE 1 | 77,000 |
| EXAMPLE 2 | 42,000 |
| EXAMPLE 5 | >100,000 |

EXAMPLE 2

FIG. 3 shows the capacity output of EXAMPLE 2, a ten-cell bipolar battery under a compression corresponding to a 100 kg load, as a function of cycle number when the battery device was charged and discharged at the 1C rate of 190 mA. The initial battery capacity was close to the nominal cathode capacity of 190 mAh, confirming that batteries according to EXAMPLE 2 are cathode-limited. While the cycle stability was very comparable to EXAMPLE 1 over the first few hundred cycles the capacity output of EXAMPLE 2 seriously deteriorated after about 400 cycles, showing that ten cells in series, without monitoring the voltage of smaller subgroups, do not yield adequate battery stability when design parameters of EXAMPLE 2 were employed.

A second bipolar battery according to EXAMPLE 2 was tested for its high power performance. It was fully charged at the 1C rate and then discharged at the 20C rate, corresponding to 0.04 A/cm$^2$. FIG. 4 shows the 20C discharge curve of EXAMPLE 2 in comparison with EXAMPLES 1, 3, and 4. The battery run time of EXAMPLE 2 was 45 s when the cut-off voltage was set to 15 V, showing that the battery run time is independent of the number of cells, n, connected in series according to the present invention.

A third bipolar battery according to EXAMPLE 2 was tested for its high power performance over continued high power pulses. After full charge at the 1C rate, the pulse sequence detailed in TABLE 4 was applied. Results are given in TABLE 5 in comparison with other EXAMPLES of the present invention. EXAMPLE 2 provided 42,000 15 s pulses at the 20C rate, corresponding to 0.04 A/cm$^2$, before the discharge voltage dropped to below 15 V, showing less favorable stability than EXAMPLE 1 under continuous high power stress conditions.

EXAMPLE 3

FIG. 3 shows the capacity output of EXAMPLE 3, a five-cell bipolar battery under a compression corresponding to a 100 kg load, as a function of cycle number when the battery device was charged and discharged at the 1C rate of 190 mA. Note that the nominal C-rate of EXAMPLE 3 was based on cathode capacity, in the same way as for EXAMPLES 1 and 2. The initial capacity of EXAMPLE 3 was significantly lower than for EXAMPLES 1 and 2. It was close to the nominal anode capacity of 165 mAh, confirming that batteries according to EXAMPLE 3 are anode-limited. After 1000 complete charge/discharge cycles, the battery capacity was still 78% of the initial one, showing the excellent cycle stability of a five-cell bipolar battery according to the present invention.

A second bipolar battery according to EXAMPLE 3 was tested for its high power performance. It was fully charged at the 1C rate and then discharged at the 20C rate, corresponding to 0.04 A/cm$^2$. FIG. 4 shows the 20C discharge curve of EXAMPLE 3 in comparison with EXAMPLES 1, 2, 4. The battery run time of EXAMPLE 3 was 54 s when the cut-off voltage was set to 7.5 V, showing the favorable high power performance of the EXAMPLE according to the present invention. In comparison with EXAMPLE 1 (r=1.1), the battery run time of EXAMPLE 3 (r=0.87) was longer and the discharge curve flatter, showing that an anode-to-cathode capacity ratio of r<1 can be beneficial for certain applications, particularly at elevated power.

EXAMPLE 4

FIG. 3 shows the capacity output of EXAMPLE 4, a ten-cell bipolar battery under a compression corresponding to a 100 kg load, as a function of cycle number when the battery device was charged and discharged at the 1C rate of 190 mA Note that the nominal C-rate of EXAMPLE 4 was based on cathode capacity in the same way as for EXAMPLES 1 and 2. The initial capacity of EXAMPLE 4 was significantly lower than for EXAMPLES 1 and 2. It was close to the nominal anode capacity of 165 mAh, confirming that batteries according to EXAMPLE 4 are anode-limited. While the cycle stability was comparable to EXAMPLE 3 over the first 400-500 cycles, the capacity output of EXAMPLE 4 seriously deteriorated after about 680 cycles. In comparison with EXAMPLE 2 (r=1.1), the cycle life of EXAMPLE 4 (r=0.87) was improved by about 200 cycles, showing that r<1 can be beneficial for achieving higher battery cycle life.

A second bipolar battery according to EXAMPLE 4 was tested for its high power performance. It was fully charged at the 1C rate and then discharged at the 20C rate, corresponding to 0.04 A/cm$^2$. FIG. 4 shows the 20C discharge curve of EXAMPLE 4 in comparison with EXAMPLES 1-3. The battery run time of EXAMPLE 4 was 54 s when the cut-off voltage was set to 25 V, showing the favorable high power performance of the EXAMPLE according to the present invention. In comparison with EXAMPLE 2 (r=1.1), the battery run time of EXAMPLE 4 (r=0.87) was longer and the discharge curve flatter, showing again that an anode-to-cathode capacity ratio of r<1 can be beneficial for certain applications, particularly at elevated power.

EXAMPLE 5

Figure 5:
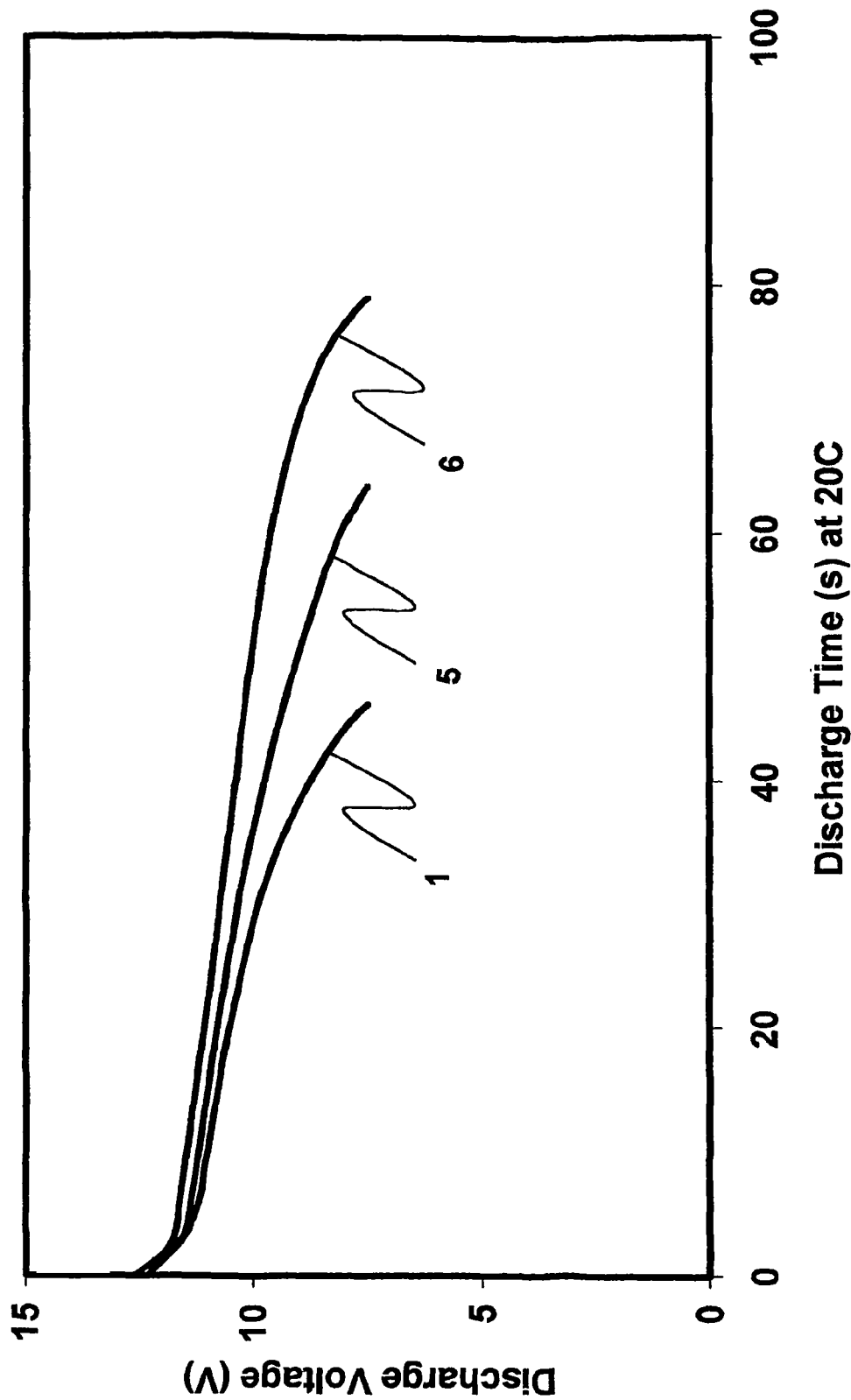
FIG. 5 is a graph displaying the high power discharge profiles for EXAMPLES 5 and 6, in comparison with EXAMPLE 1 of the present invention.

A bipolar battery according to EXAMPLE 5 was assembled using an electrolyte solution with a higher electrolytic conductivity than in the case of EXAMPLES 1-4. EXAMPLE 5 was tested for its high power performance. It was fully charged at the 1C rate and then discharged at the 20C rate, corresponding to 0.04 A/cm$^2$. FIG. 5 shows the 20C discharge curve of EXAMPLE 5, in comparison with EXAMPLE 1, where the latter was based on a lower conductivity electrolyte solution. The battery run time of EXAMPLE 5 was 64 s when the cut-off voltage was set to 7.5 V, showing the very favorable high power performance of the EXAMPLE according to the present invention.

A second bipolar battery according to EXAMPLE 5 was tested for its high power performance over continued high power pulses. After fill charge at the 1C rate, the pulse sequence detailed in TABLE 4 was applied. Results are given in TABLE 5 in comparison with other EXAMPLES of the present invention. EXAMPLE 5 provided 100,0000 15 s pulses at the 20C rate, corresponding to 0.04 A/cm$^2$, without the voltage dropping to below 7.5 V, showing the excellent stability under continuous high power stress conditions of the EXAMPLE according to the present invention.

EXAMPLE 6

Another bipolar battery was assembled using the same electrolyte solution and the same number of cells in series (n=5) as for EXAMPLE 5. In contrast to EXAMPLE 5 (r=1.1), EXAMPLE 6 (r=0.87) was however anode-limited. EXAMPLE 6 was tested for its high power performance. It was fully charged at the 1C rate and then discharged at the 20C rate, corresponding to 0.04 A/cm². FIG. 5 shows the 20C discharge curve of EXAMPLE 6 in comparison with EXAMPLES 1 and 5. The battery run time of EXAMPLE 6 was 75 s when the cut-off voltage was set to 7.5 V, showing the excellent high power performance of the EXAMPLE according to the present invention. In comparison with EXAMPLE 5, the battery run time of EXAMPLE 6 was longer and the discharge curve flatter, showing that an anode-to-cathode capacity ratio of r<1 can be beneficial for certain applications, particularly at elevated power rates.

EXAMPLE 7

Figure 6:
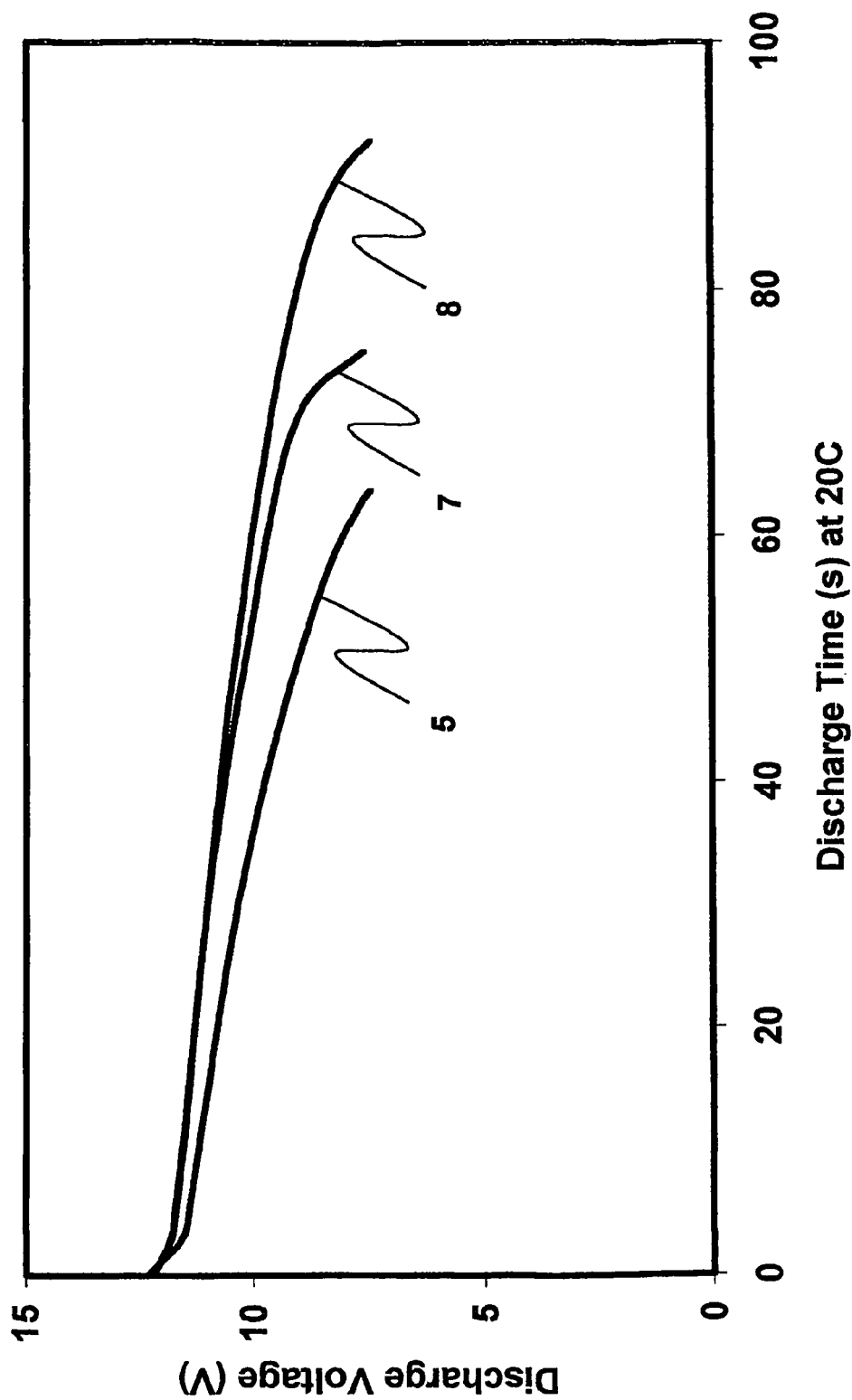
FIG. 6 is a graph displaying the high power discharge profiles for EXAMPLES 7 and 8, in comparison with EXAMPLE 5 of the present invention.

Another bipolar battery was assembled using an electrolyte solution with a higher electrolytic conductivity than in the case of EXAMPLES 1-4. In contrast to EXAMPLES 5 and 6, the solvent system of EXAMPLE 7 had a much higher boiling point (see TABLE 3). EXAMPLE 7 was tested for its high power performance. It was fully charged at the 1C rate and then discharged at the 20C rate, corresponding to 0.04 A/cm². FIG. 6 shows the 20C discharge curve of EXAMPLE 7, in comparison with EXAMPLE 5. The battery run time of EXAMPLE 7 was 75 s when the cut-off voltage was set to 7.5 V, showing the excellent high power performance of the EXAMPLE according to the present invention. In comparison with EXAMPLE 5, the average discharge voltage of EXAMPLE 7 was significantly higher, despite the much higher boiling of the solvent system and the slightly lower electrolyte conductivity, because the electrolyte system of EXAMPLE 7 offers overall more favorable $Li^+$ transport properties.

EXAMPLE 8

Another bipolar battery was assembled using the same solvent system as for EXAMPLE 7. In comparison to EXAMPLE 7, however, the electrolyte concentration of EXAMPLE 8 was higher resulting in a slightly lower electrolyte conductivity (see TABLE 3). EXAMPLE 8 was tested for its high power performance. It was fully charged at the 1C rate and then discharged at the 20C rate, corresponding to 0.04 A/cm². FIG. 6 shows the 20C discharge curve of EXAMPLE 8, in comparison with EXAMPLES 5 and 7. The battery run time of EXAMPLE 8 was 92 s when the cut-off voltage was set to 7.5 V, showing the outstanding high power performance of the EXAMPLE according to the present invention. In comparison with EXAMPLE 5, the average discharge voltage of EXAMPLE 8 was significantly higher despite the much higher boiling of the solvent system and the lower electrolyte conductivity because the electrolyte system of EXAMPLE 8 offers overall more favorable $Li^+$ transport properties. In addition, the higher electrolyte concentration of EXAMPLE 8 in comparison to EXAMPLE 7, provides a mechanism to limit concentration polarization during high power discharge events, thus resulting in overall better cell capacity utilization.

EXAMPLE 9

In order to demonstrate that the present invention is suitable for large-footprint batteries, another example was assembled based on much larger electrodes than used for EXAMPLES 1-8. A 50 µm thick foil of high purity aluminum was primed with a suspension of graphite and carbon black in an aqueous solution of polysilicate. The suspension was coated to one side of the aluminum foil only for end plates and to both sides for bipolar plates to yield a primed area of 294 mm×169 mm. The electrodes were based on $Li_4Ti_5O_{12}$ and $Li_{1.05}Cr_{0.10}Mn_{1.90}O_4$, coated on top of the primed layer from slurries based on N-methyl-2-pyrrolidinone, PVDF and carbon to one side for end plates or to two sides for bipolar plates to yield for each side coated areas of 294 mm×169 mm. Cathode nominal capacity was 0.94 Ah and anode nominal capacity was 1.04 Ah, resulting in an anode-to-cathode capacity ratio of 1.1. All electrode plates were dried and calendered.

Frames of SURLYN® 1652 film (DuPont) were die-cut to outer dimensions of 377 mm×214 mm and an inner section of 303 mm×178 mm was cut and removed. The distance between three of the frame edges and the inner section was 18-19 mm, while it was 55 mm between the fourth edge of the frame and the inner section. An anode end plate was then placed between two frames by centering the coated area with respect to the open frame area. The anode end plate was then thermally bonded to the two frames by using a commercially available heated press. In this process the areas around the perimeters of the two frames, extending over the substrate plates, were fused together as well, resulting in an easy-to-handle and easily stackable framed electrode. This same process was repeated with four bipolar plates and a cathode end plate. A 183 mm×308 mm piece of microporous polyolefinic separator was then positioned on top of each cathode layer and partially over the frame area of the corresponding plate. For each of the electrode plates, the separator was then heat-welded to the uncoated substrate on two opposite sides. A framed cathode end plate with its separator attached was laid on a flat surface with the cathode and separator facing upward. Four framed bipolar plates, with their respective separator layer attached, were stacked on top of the cathode end plate, always with their cathode sides facing upward and the frame edges being properly aligned Finally, a framed anode end plate, with its active side facing downward, was positioned on top of the stack. Three sides of the resulting five-cell stack were then heat-sealed together by applying heat and pressure from the top and the bottom onto the frame edges over a width of about 10 mm. The appropriate amount of 1 M $LiPF_6$ dissolved in 1:1 EC:DMC was then injected into each of the cells in order to thoroughly wet out the electrodes and the separator. The assembly was then cooled down to around −18° C. and evacuated close to −1 bar and the open edge sealed under vacuum, resulting in a fourth sealed edge area of about 10 mm width; This procedure resulted in a 5-cell bipolar monolithic unit of 12.5 V nominal voltage and 0.94 Ah nominal capacity with a 35-37 mm wide section along the forth side as head space. This head space could accommodate any gaseous products possibly formed due to operation at very high temperatures or under abuse conditions. The monolithic unit was further sealed around its entire perimeter with a laminate of polypropylene/aluminum/polyester, which itself was attached in a hermetic way to the outside of the cathode and the anode end plate. Two pieces of 1 mm thick 295 mm×170 mm nickel foam mat with 60 ppi pore size were placed onto both end plates followed by two terminal plates of 1 mm aluminum sheets of 295 mm×170 mm size, with a 20 mm wide tab being an integral part of each sheet. This assembly was placed between two rigid FORMICA® plates and then into a spring-loaded mechanical compression device, where compression corresponding to a 1500 kg load was applied. The compression device was calibrated using a compression load cell from OMEGADYNE®.

Figure 7:
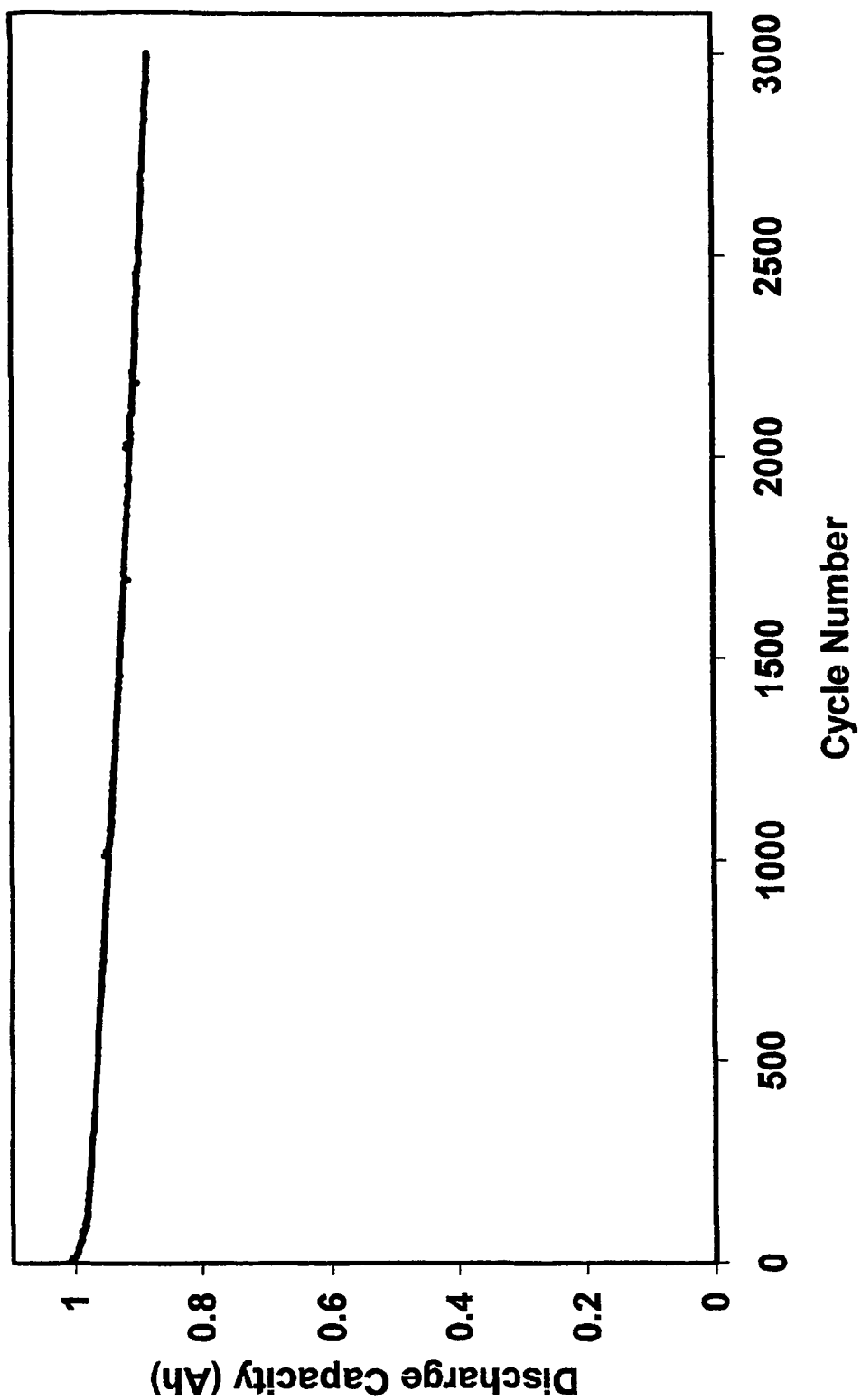
FIG. 7 is a graph displaying the capacity output as a function of cycle number for EXAMPLE 9 of the present invention.

FIG. 7 shows the capacity output of EXAMPLE 9, a five-cell bipolar battery under a compression corresponding to a 1500 kg load, as a function of cycle number when the battery device was charged and discharged at 1 A at an ambient temperature of 22±2° C. The initial battery capacity was close to the nominal cathode capacity of 0.94 Ah, confirming that batteries according to EXAMPLE 9 are cathode-limited. After 3000 complete charge/discharge cycles the battery capacity was still 0.88 Ah, corresponding to more than 90% of its nominal capacity, showing the outstanding cycle stability of a large footprint five-cell bipolar battery according to the present invention.

The foregoing description, drawings and examples merely explain and illustrate the invention and the invention is not limited thereto except insofar as the appended claims are so limited, as those skilled in the art who have the present disclosure before them will be able to make modifications and variations therein without departing from the scope of the invention.

What we claim is:

1. A bipolar high power battery, comprising:
   a) at least one group of n stackable electrochemical energy storage cells, connected in series, the cells having:
      a lithium ion insertion cathode on a current collector substrate and a lithium ion insertion anode on a current collector substrate, with an anode-to-cathode capacity ratio r;
      a separator material associated between the anode and the cathode; and
      an electrolyte system;
      wherein $2 \leq n \leq 50$ and $0.6 \leq r < 1$;
   b) a leak-proof seal structure;
   c) means for voltage monitoring of subgroups of m storage cells connected in series where $2 \leq m \leq 10$ and $m \leq n$; and
   d) means for keeping the battery under compression.

2. The device according to claim 1, wherein the anode includes a lithiated titanium oxide.

3. The device according to claim 2, wherein the lithiated titanium oxide is of the spinel type.

4. The device according to claim 3, wherein the cathode includes a lithium manganese oxide.

5. The device according to claim 4, wherein the lithium manganese oxide is of the spinel type.

6. The device according to claim 5, wherein the cathode comprises a lithium insertion material having a dopant selected from the group consisting of B, Al, Mg, Ca, Zn, Fe, Mn, Ni, Co, and Cr.

7. The device according to claim 1, wherein both the anode and the cathode have a porosity between 30% and 60% each.

8. The device according to claim 1, wherein the device additionally comprises at least one conductive primer layer, wherein the conductive primer layer is positioned between at least one of the anode and the adjacent current collector and the cathode and the adjacent current collector.

9. The device according to claim 8 having a charge and discharge capability of at least 0.04 A/cm² for more than 60s.

10. The device according to claim 9, wherein the compression means comprises a mechanical compression device.

11. The device according to claim 10, wherein the level of compression is between 0.02 MPa and 1 MPa.

12. The device according to claim 11, wherein the electrolyte system comprises a nonaqueous electrolyte system.

13. The device according to claim 12, wherein the electrolyte system comprises a lithium-based salt selected from the group consisting of $LiPF_6$, $LiBF_4$, $LiN(SO_2CF_3)_2$, $LiN(SO_2C_2F_5)_2$, $LiC(SO_2CF_3)_3$, $LiClO_4$, $LiAsF_6$, lithium bisoxalatoborate and other lithium borates.

14. The device according to claim 13, wherein the concentration of the lithium-based salt is between 1.0 and 1.6 M.

15. The device according to claim 14, additionally comprising at least one electrolyte solvent, wherein the at least one solvent associated with the electrolyte is selected from the group consisting of propylenecarbonate, ethylenecarbonate, diethylcarbonate, dimethylcarbonate, ethyl-methylcarbonate, gamma-butyrolactone, ethylacetate, ethylbutyrate, ethylpropionate, methylbutyrate, 1,2-dimethoxyethane, 1,2-diethoxyethane, 2-methoxyethylether, methoxypropionitrile, valeronitrile, dimethylacetamide, diethylacetamide, sulfolane, dimethysulfite, diethysulfite, trimethylphosphate and ionic liquids.

16. The device according to claim 15, wherein the electrolyte system has a conductivity of at least 8 mS/cm at 25° C.

17. The device according to claim 16, wherein the seal structure comprises at least one polymer selected from the group consisting of thermoplastic polymers, thermoplastic ionomers, duroplastic polymers, and resins.

18. The device according to claim 17, wherein the seal structure comprises at least one layer of barrier material, associated with the device in a hermetic way.

19. The device according to claim 18, wherein the barrier material consists of a composite comprising at least one heat-sealable layer, one barrier layer, and one additional insulating layer.

20. The device according to claim 1, wherein the seal structure may provide a section for each cell where gas can accumulate or be absorbed by getters.

21. The device according to claim 1, comprising:
   a) at least two groups of $n_l$ to $n_z$ stackable electrochemical energy storage cells, connected in series within each group, the cells having:
      a lithium ion insertion cathode on a current collector substrate and a lithium ion insertion anode on a current collector substrate, with an anode-to-cathode capacity ratio r;
      a separator material associated between the anode and the cathode; and
      an electrolyte system;
      where z is any integer, $2 \leq n_i \leq 50$, $1 \leq i \leq z$, and $0.6 \leq r < 1$;
   b) a leak-proof seal structure;
   c) means for voltage monitoring of subgroups of m cells connected in series where $2 \leq m \leq 10$ and $m \leq n_i$; and
   d) means of keeping the battery under compression.

22. The device according to claim 21, wherein the at least two groups of $n_l$ to $n_z$ stackable electrochemical energy storage cells are configured in any combination of series and parallel connections.

23. The device according to claim 22, wherein all $n_l$ to $n_z$ numbers are identical.

24. The device according to claim 21, wherein the at least two groups of $n_l$ to $n_z$ stackable electrochemical energy storage cells are electrically connected by contacting means.

25. The device according to claim 24, wherein contacting means comprise a conductive sheet of material held in place and providing electrical contact to and in-between device end plates by the means for keeping the battery under compression.

* * * * *